Oct. 28, 1958  C. L. ROBINSON  2,857,789
POWER OPERATED TOOL WITH CONTROLLED POWER FEED
Filed Jan. 27, 1953  3 Sheets-Sheet 1
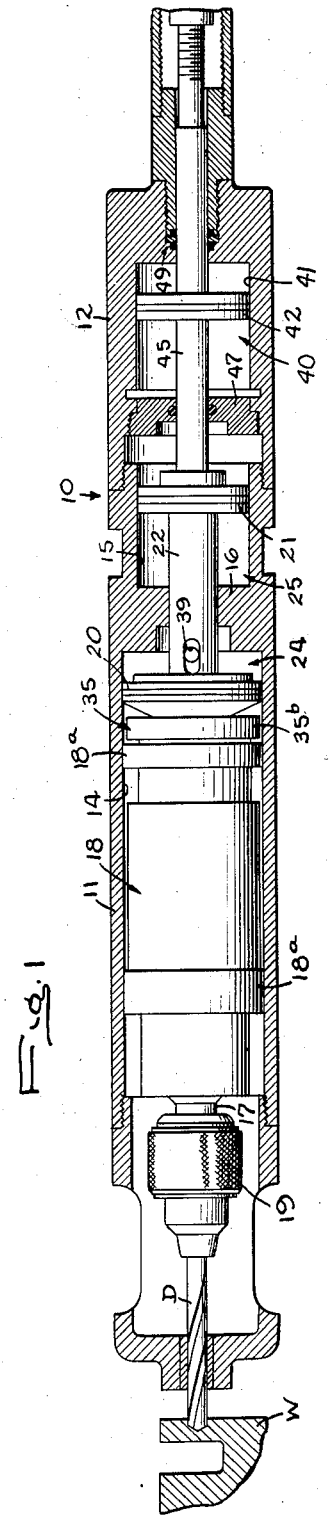
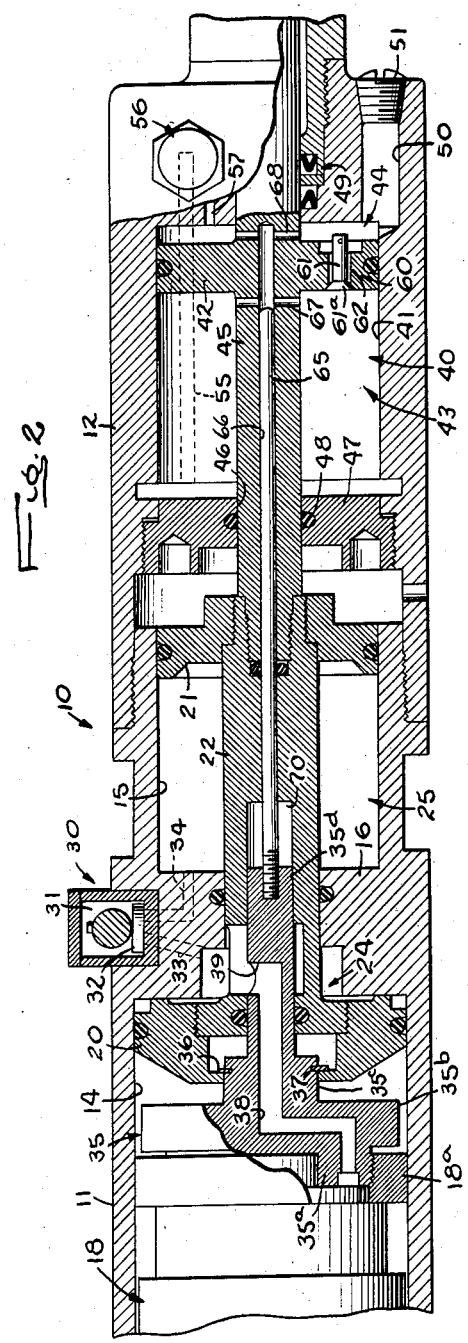
INVENTOR
Claude L. Robinson
By Carlson, Pitzner, Hubbard & Wolfe
ATTORNEYS

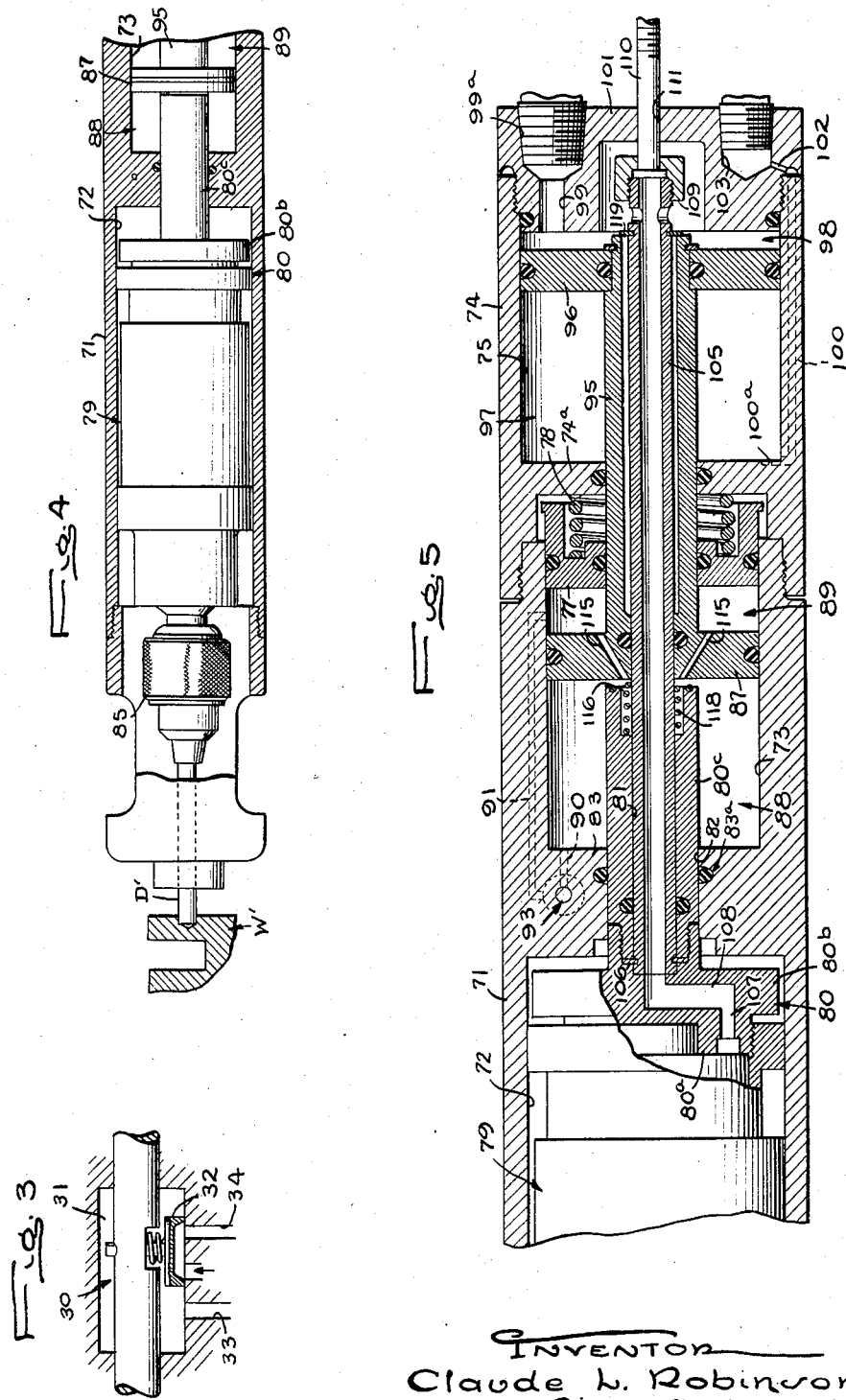

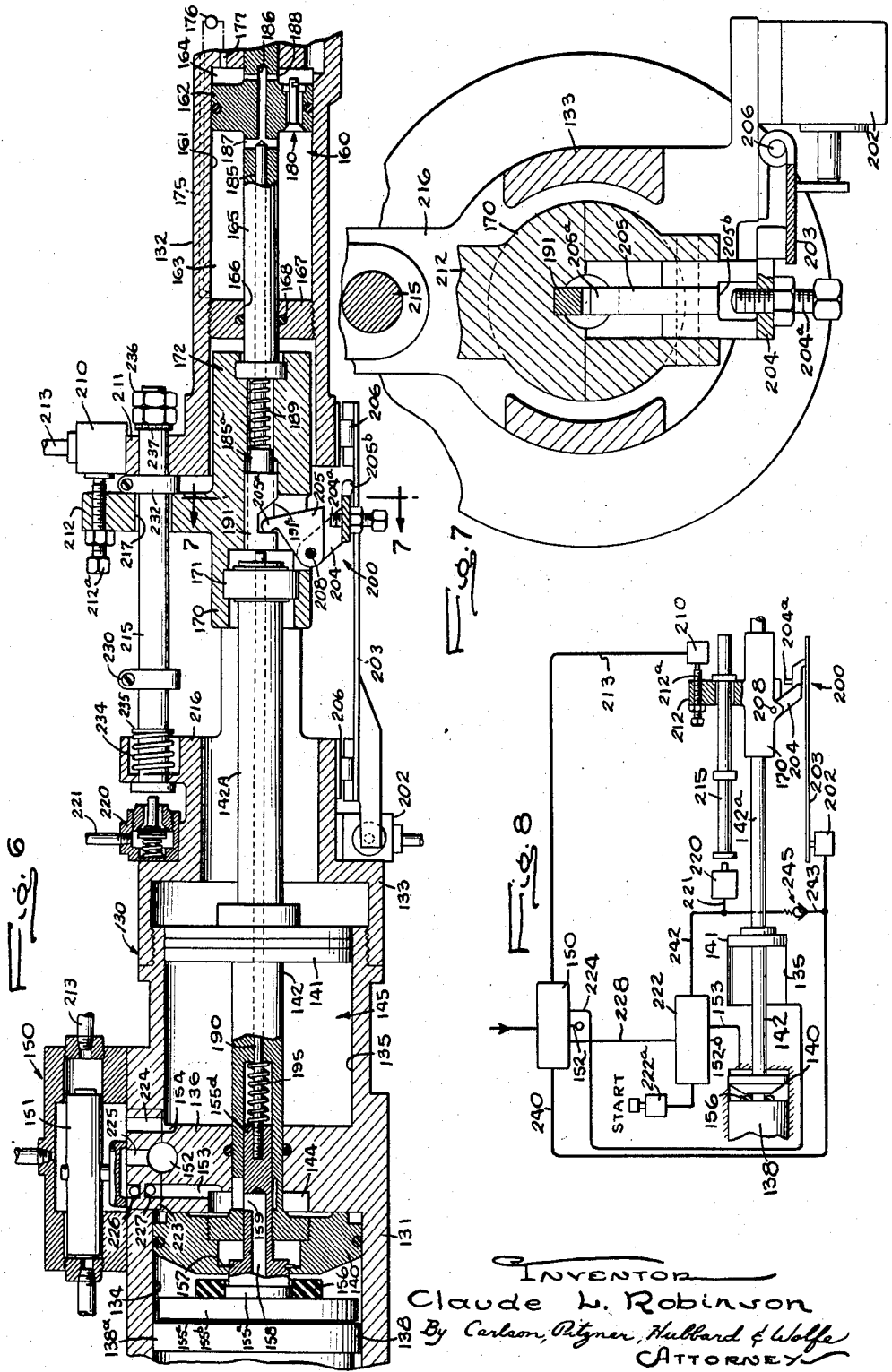

United States Patent Office 2,857,789
Patented Oct. 28, 1958

2,857,789

POWER OPERATED TOOL WITH CONTROLLED POWER FEED

Claude L. Robinson, Grand Haven, Mich., assignor, by mesne assignments, to Gardner-Denver Company, a corporation of Delaware Application January 27, 1953, Serial No. 333,518

25 Claims. (Cl. 77—32.4)

The present invention relates to pressure fluid operated tools and has particular reference to the control of the tool spindle in its movements axially with respect to the work. The instant application is a continuation-in-part of my application Serial Number 261,542, filed December 13, 1951, now abandoned.

A general object of the invention is to provide in a tool of the foregoing character simple, effectual and reliable means for controlling axial movement of the tool spindle which means is responsive to resistance to movement of the spindle with respect to the work.

Another object is to provide control means for automatically effecting a change in the rate of movement of the tool spindle in response to resistance encountered during movement thereof. A related object is to provide a novel control mechanism for an air or other fluid pressure operated tool capable of effecting a rapid approach of the tool spindle to the work, then a forward feeding movement thereof upon engagement with the work of a tool element, such as a drill or the like, carried by the spindle, and thereafter to effect further rapid advance of the spindle when the tool element has penetrated the work.

Still another object of the invention is to provide in a power operated tool a normally ineffective dashpot which is rendered effective in response to the engagement of the tool with the work to control the feed rate of the tool spindle.

A further object of the invention is to provide control means responsive to resistance to the advance of the cutting element with respect to the work to automatically effect retraction of the cutting element. A related object is to provide a power feed control means which is effective not only to cause retraction of the cutting element but which is thereafter effective to restore the cutting element to cutting engagement with the work.

A more detailed object of the invention lies in the provision of control means for a tool for performing drilling and allied operations on a workpiece which is capable first of effecting a rapid approach of the tool spindle toward the work; second of effecting a forward feeding movement thereof upon engagement with the work of a cutting element carried thereby; third of automatically effecting a retraction of the spindle so as to withdraw the cutting element from the work when substantially increased resistance to movement thereof is encountered; fourth to automatically advance the spindle at the rapid approach rate into engagement with the work to continue operation of the cutting element thereon; and fifth, upon completion of such operation to return the spindle to rest position.

The objects of the invention thus generally set forth together with other objects and ancillary advantages are attained by the construction and arrangement shown by way of illustration in the accompanying drawings, in which:

Figure 1 is a central longitudinal section through a power operated drilling tool with controlled power feed embodying features of the present invention and showing component relationship in feeding condition.

Fig. 2 is also a central longitudinal section similar to Fig. 1 but on a somewhat enlarged scale and illustrating component relationship in rapid advance condition.

Fig. 3 is a fragmentary diagrammatic representation of the reversing valve for the foregoing illustrative tool.

Fig. 4 is a fragmentary longitudinal section through a modified form of tool embodying features of the present invention.

Fig. 5 is also a central longitudinal section through the tool shown in Fig. 4, but on a somewhat enlarged scale, and illustrating component relationship for rapid advancing condition of operation.

Fig. 6 is a fragmentary central longitudinal section through another modified form of tool embodying the features of the present invention.

Fig. 7 is a transverse section taken substantially in the plane of line 7—7 in Fig. 6.

Fig. 8 is a diagrammatic representation of the control valving of the tool shown in Fig. 6.

While the invention is susceptible of various modifications and alternative constructions, there are shown in the drawings and will herein be described in detail the preferred embodiments, but it is to be understood that it is not thereby intended to limit the invention to the forms disclosed, but it is intended to cover all modifications and alternative constructions falling within the spirit and scope of the invention as expressed in the appended claims.

Referring more particularly to the drawings, the first form of the invention there shown for purposes of illustration is embodied in a tool of the type in which the tool element such as a drill D is mounted on the spindle of a motor which in turn is slidable in a stationarily supported housing. As shown, a two-part housing 10 is provided which includes a forward or main section 11 and a rear section 12. The forward section is of generally tubular form defining a main or feed cylinder 14 and a return cylinder 15, the two cylinders being separated by a transverse partition 16. Slidably disposed within the feed cylinder 14 is a motor 18 containing a tool spindle 17 which carries a tool receiving chuck 19 on its forward end. The motor in effect constitutes a plunger which is adapted to be reciprocated longitudinally within the cylinder 14, such movement being guided by suitable guide rings 18a rigid with the motor and constituting anti-friction bearing supports therefor.

To reciprocate the motor 18, its tool spindle 17, chuck 19 and the cutting element D, a pair of pistons 20 and 21 are provided. The piston 20 is received in the forward or feed cylinder 14 of the main housing portion 11, and the piston 21 is received in the rear or return cylinder 15. Thus they may be conveniently termed feed and return pistons, respectively. The two pistons are maintained in rigid spaced relation by means of a rod 22 which extends through the partition 16 and is suitably formed at its opposite ends for connection with the pistons. The feed piston 20 together with the housing portion 11 and its partition 16 define a forward pressure chamber generally designated 24. Similarly, the return piston 21, the forward housing section 11 and the partition 16 define a rear pressure chamber 25.

Pressure fluid, such as compressed air, is admitted alternatively to the two pressure chambers 24 and 25 under the control of valve means indicated generally at 30. As shown, the valve means is carried by the forward housing section 11, being attached thereto adjacent the partition 16. Preferably, the valve means includes a housing 31 longitudinally shiftable within which is a valve member 32 for controlling the admission of pressure fluid to and the exhaust of spent fluid from the chambers 24 and 25. Suitable ports 33 and 34 are provided in the partition 16 of the forward housing portion 11 to interconnect the pressure chambers 24 and 25 with the valve 30. With the valve member 32 in one position, pressure fluid is admitted to the forward pressure chamber behind the feed piston 20 to advance the same forwardly in the cylinder 14. Simultaneously the rear pressure chamber 25 is vented to the atmosphere. Alternatively, with the valve member 32 shifted into another position, pressure fluid is admitted to the rear pressure chamber 25 to act against the return piston 21 to move it rearwardly. At the same time the feed piston chamber 24 is vented.

The motor 18 is coupled to the piston 20 by means of an end cap 35. This cap is of stepped cylindrical form having a forward portion 35a which is received within the rear end ring 18a of the motor. Rearwardly of the forward portion 35a of the end cap is an enlarged portion 35b and a portion 35c of reduced diameter. The end cap 35 terminates at its rear end in an elongated rodlike portion 35d. The feed piston 20 and the piston rod 22 are suitably apertured coaxially thereof for the reception of the end cap portions 35c and 35d, respectively.

Forward movement of the feed piston 20 is imparted to the motor 18 by engagement of the piston with the rear face of the motor end cap portion 35b. Rearward motion, as effected by the return piston 21, so as to retract the motor 18, is imparted thereto by the engagement of the feed piston with a retainer ring 36 carried by the end cap portion 35c. The latter, as shown, comprises a simple, radially extending snap-ring received in a suitable annular channel 37 formed in the end cap portion 35c.

The motor 18 is preferably of the rotary vane type adapted for actuation by compressed air. It may conveniently be of the form shown in Patent No. 1,940,024 to Ernest H. Shaff. In order to supply pressure fluid, such as compressed air, to actuate the motor, the end cap 35 thereof is provided with a passage 38 which communicates by way of a port 39 with the pressure chamber 24 for the feed piston 20 rearwardly of the latter. Thus, pressure fluid supplied to advance the tool is also conveniently used to actuate the motor.

The rate of advance of the feed piston 20 and of the motor 18 with its cutting element D is under the control of a hydraulic dashpot indicated generally at 40. The dashpot comprises a cylinder 41 defined by the rear housing section 12, and a piston 42 reciprocable within the cylinder. The piston thus divides the dashpot cylinder 41 into forward and rear chambers 43 and 44. The cylinder is completely filled with hydraulic fluid such as light oil. The dashpot piston 42 is equipped with a suitable coaxially disposed rod 45 which extends through a central aperture 46 in an end plate 47 rigid with the rear housing section 12. It is equipped with suitable packing 48 to prevent leakage of the hydraulic fluid from the forward dashpot chamber 43. The rear housing section 12 is closed at its rear end. However, it is centrally apertured for the reception of the rear end of the dashpot piston rod 45 and is equipped with suitable packing at 49 to prevent leakage or "drag out" of the hydraulic fluid of the dashpot. Adjacent its rear end the rear housing section 12 is provided with a suitable dashpot cylinder filling opening 50 through which hydraulic fluid can be introduced into the dashpot cylinder. The outer end of the opening 50 is equipped with a closure plug 51.

The forward end of the dashpot piston rod 45 is rigidly secured to the air piston assembly 20, 21 and 22 so as to be movable therewith. Upon admission of pressure fluid behind the feed piston 20 to advance the same, the dashpot piston, too, is moved forwardly, and hydraulic fluid in the forward dashpot chamber 43 is forced therefrom to the rear dashpot chamber 44. For this purpose and to provide for an adjustable feed rate, restricted communication is provided between the two chambers. Thus the rear housing section is provided with a generally longitudinal passage 55 communicating at its forward end with the forward end of the dashpot chamber 43. The rear end of the passage 55 communicates with a feed control regulating valve generally indicated at 56. Communication between the valve 56 and the rear dashpot chamber 44 is afforded by a passage 57. The feed control regulating valve 56 is preferably of the type disclosed in the co-pending application of Verner Kempinen, Serial No. 246,069, filed September 11, 1951, now abandoned, although it may, if desired, comprise a conventional needle valve or the like.

Upon completing its full forward stroke, the tool is reversed so as to retract the air piston assembly 20, 21 and 22, the motor 18 and its cutting element D, by operation of the valve 30 to supply pressure fluid to the rear pressure chamber 25 to act on the return piston 21. So that a rapid return movement of the aforesaid elements can take place, the dashpot piston 42 is equipped with a check valve 60. The check valve 60, as shown, comprises simply a poppet type valve member 61 axially slidable in a passage 62 through the dashpot piston 42. The valve member 61 includes a head 61a on its forward end which is adapted to be seated against a complementally shaped seat formed by suitably flaring the outer end of the passage 62. Forward movement of the piston causes the poppet valve member 61 to be seated so as to prevent the passage of hydraulic fluid through the piston passage 62. Upon return movement of the piston 42 the valve member 61 simply leaves its seat so as to provide free communication for the passage of hydraulic fluid from the rear dashpot chamber 44 to the forward chamber 43 thereof.

In accordance with the invention means is provided for automatically controlling axial movement of the tool with respect to the work in direct response to the amount of resistance encountered during such movement. In the illustrative embodiments of the invention movement of a spindle mounting a tool element is controlled both as to direction and as to rate in response to resistance offered by the work to the tool element.

In carrying out one important aspect of the invention, control means is provided which is responsive to the resistance offered by the work to the advance of the tool with respect thereto so as to effect a change in the speed or rate of advance of the tool spindle 17 between rapid approach and slow feed movements. More specifically, means is provided whereby the tool, including the air piston assembly 20, 21 and 22 and the air motor 18 with its tool element in this case a cutting element D, are rapidly advanced into engagement with a workpiece W, and thereupon its speed is changed to a relatively slower rate for feeding the cutting element into the work. The instant control means is also effective when the cutting element has penetrated the work to effect a change of the rate of advance of the tool from a slow-feed movement to a rapid advance movement. By way of example, if the instant tool is to be employed for the drilling of alined holes in two spaced parts of a workpiece, it is desirable first to bring the cutting element rapidly into engagement with the first portion thereof that is to be drilled, then to reduce its speed of advance to a slow feeding movement for drilling a hole in such first portion of the work; thereafter, when the cutting element has penetrated the first portion of the work, to rapidly advance the cutting element D into engagement with the second portion of the workpiece, and then to change to slow-feed movement for drilling the second workpiece portion. It is to be understood, of course, that in drilling work of lamina form which includes a layer of relatively soft material which can be readily penetrated, such layer will be drilled at the rapid-advance rate of movement of the tool. Materials of this type are frequently encountered as in the manufacture of military aircraft where the "skin" is a hard aluminum alloy and is separated from an inner steel armor sheath by a layer of soft insulating material. In the drilling of such material the tool is advanced at the slow-feed rate during penetration of the aluminum alloy and steel and at the rapid-advance rate during penetration of the insulation material.

In the attainment of the results set forth, means is provided for rendering the dashpot ineffective to produce a slow feed rate when relatively little or no resistance is offered to the advance of the cutting element. As shown, means is provided which effectively by-passes the feed control regulator 56 when there is relatively little resistance to the advance of the cutting element D so as to provide unrestricted communication for the flow of hydraulic fluid from the forward dashpot chamber 43 to the rear dashpot chamber 44. Conversely, upon engagement of the cutting element D with the work, means are provided including the control mechanism, reactive to the amount of increased resistance to the advance of the tool, to close the by-pass and to re-establish communication between the forward and rear dashpot chambers by way of the feed control regulator 56. Thus the dashpot is rendered effective and offers an impedance to the advance of the tool spindle.

In the first form of the invention illustrated, the control mechanism includes a system of passages establishing communication between the forward and rear dashpot chambers 43 and 44, respectively, and a valving rod 65 effective to control the flow of hydraulic fluid through the system passages. The system of passages includes a central passage 66 disposed coaxially of the piston rods 22 and 45 and transverse passages 67 and 68 intersecting the central passage 66 adjacent the rear end thereof on opposite sides of the dashpot piston 42. The transverse passages extend through the piston rod 45 for communication respectively with the forward and rear dashpot chambers 43 and 44. The valve rod 65 is received in the passage 66 and the forward end thereof is rigidly secured, as by screw-threading, to the rear end of the end cap portion 35d so as to be movable therewith.

In order to effect movement of the valve rod 65 within the passage 66 and thus with respect to the piston rods 22 and 45, lost motion is provided in the connection between the feed piston 20 and the tool carrying motor 18. Such lost motion is afforded in the present instance by axially spacing apart the retainer ring 36 and the rear surface of the intermediate end cap portion 35b.

Upon operating the valve 30 so that pressure fluid is admitted to the forward pressure chamber 24 behind the feed piston 20 to advance the tool, some of the pressure fluid finds its way between the rear portion 35d of the motor end cap 35 and the surrounding wall of the piston rod 22 into a chamber 70 defined between the end surface of the rear end cap portion 35d and the bottom of the enlarged forward end of the coaxial passage 66 in the piston rod. This pressure fluid serves, when there is relatively little resistance offered to the advance of the tool, to move the motor 18 and its end cap 35 forwardly with respect to the feed piston 20 into the position shown in Fig. 2. Upon forward movement of the motor 18 and its end cap 35, the valve rod 65 also is moved forwardly with respect to the piston rods 22 and 45. Such movement opens the dashpot by-pass passage system 67, 66, 68 so as to effect free communication between the forward and rear dashpot chambers 43 and 44 for the flow of hydraulic fluid and thereby by-passes the feed control regulator 56.

Upon engagement of the cutting element D with the work, its forward motion is momentarily stopped, sufficient resistance being offered to the advance thereof to overcome the force of the pressure fluid acting on the rear end surface of the motor end cap portion 35d in the chamber 70. Fluid pressure in the chamber 24 behind the feed piston 20, however, continues forward movement thereof thus moving the same forwardly relative to the motor end cap 35 until the feed piston engages the rear surface of the motor end cap portion 35b. Upon such relative movement of the feed piston 20 with respect to the motor end cap 35, the piston rod 22, 45 moves correspondingly forward with respect to the valving rod 65. Thus the rear end of the valving rod 65 closes off the system of passages 67, 66 and 68 comprising the feed control regulator by-pass. As a result, further advance of the tool by the action of pressure fluid on the feed piston 20 is under control of the regulator 56, since with the by-pass passage system closed, hydraulic fluid from the forward dashpot chamber 43 must pass through the line 55, 57 by way of the feed control regulator 56 to the rear dashpot chamber 44 as the dashpot piston 42 advances with the air piston assembly 20, 21, and 22. Therefore, the tool is advanced at a slow feed rate as determined by the setting of the feed control regulator 56.

When the cutting element D has penetrated the first portion of the workpiece W, the resistance to its forward movement is removed. Pressure fluid in the chamber 70, acting on the rear end surface of the motor end cap portion 35d, again becomes effective to move the end cap 35, and thus the motor 18, forwardly with respect to the air piston assembly 20, 21 and 22 until the retainer ring 36 engages the feed piston 20. This relative movement between the motor end cap 35 and the air piston assembly produces a similar movement of the valve rod 65 within the piston rod 45 which results in the opening of the dashpot by-pass passage system 67, 66, 68 so as to re-establish unrestricted communication between the forward and rear dashpot chambers 43 and 44. As a result, the tool is rapidly advanced into engagement with the second portion of the workpiece W.

Upon engagement of the cutting element D with the second portion of the workpiece, the previously described action is repeated and a change from rapid approach movement to slow feed is again effected.

Turning now to the second of the illustrated forms of the invention (see Figs. 4 and 5), the tool there shown includes a main housing section 71, defining a forward chamber 72 and a dashpot cylinder 73, and a rear housing section 74 defining an air cylinder 75. The rear end of the dashpot cylinder 73 is closed by means of a piston 77. The latter is urged forwardly by means of an expansion-type spring 78 interposed between it and the transverse front wall 74a of the rear housing section 74 so as to maintain a static pressure on the hydraulic fluid in the dashpot cylinder 73.

A rotary air motor 79, substantially identical with that of the previously described form of the invention, is disposed within the forward chamber 72 of the main housing section. The motor terminates at its rear end in an end cap 80. The end cap is of stepped cylindrical form having a forward portion 80a rigid with the end of the casing of the motor 79, an intermediate portion 80b, and a rear or terminal portion 80c. The latter portion of the end cap 80 is of tubular form having a stepped bore 81 therethrough, and it is received in a coaxially disposed passage 82 formed in a transverse partition 83 formed integral with the tool housing section 71. The partition 83 serves to separate the dashpot cylinder 73 from the motor chamber 72, suitable packing being provided at 83a to prevent oil leakage from the cylinder 73.

The motor 79 is of course equipped with a conventional chuck 85 for the reception of a drill D' or other rotary tool element for operation on a workpiece fragmentarily indicated at W'.

A dashpot piston 87 is received within the dashpot cylinder 73 and divides the same into forward and rear chambers 88 and 89. Communication between these two chambers is provided by means of passages 90 and 91 formed respectively in the partition 83 and side wall of the main housing section 71. At the junction of these two passages 90 and 91, and in the partition 83, is disposed a feed control regulator, indicated generally at 93, which effectively controls the flow of hydraulic fluid from the forward dashpot chamber 88 to the rear dashpot chamber 89 so as to control the rate of advance of the tool. For this purpose, the regulator, which may be like the regulator 56 in the first form of the invention illustrated or may comprise a conventional needle valve, is, of course, adjustable.

The dashpot piston 87 is rigid with the forward end of a rod 95. To the rear end of this rod is affixed an air piston 96 which is received in the air cylinder 75 defined by the rear housing section 74 and is adapted both to advance and retract the tool. Thus the air piston 96 divides the air cylinder 75 into forward and rear pressure chambers 97 and 98. Air is admitted to the air cylinder under the control of a remote four-way valve (not shown) alternatively through two supply passages 99 and 100. The passage 99 is formed in an end plug 101 which is screw-threaded into the rear end of the rear housing section 74 and serves to close the rear end of the air cylinder 75. The passage 99 terminates in an enlarged, screw-threaded bore 99a adapted to receive a suitable air hose fitting to connect the same with the remote air supply valve. At its forward end the passage 99 opens directly into the rear or "advance" pressure chamber 98 of the air cylinder 75.

The passage 100 for supplying air to the forward or "retract" pressure chamber of the air cylinder 75 is formed in the wall of the rear section 74 of the tool housing. It opens at its forward end into the forward end of the air cylinder at 100a. At its rear end it communicates with passages 102 and 103 formed in the end plug 101, the latter passage being suitably threaded for the reception of an air hose fitting for connecting the same to the remote air supply valve.

To supply air to actuate the motor 79 of the tool, communication is provided between the rear or advance pressure chamber 98 of the air cylinder 75 and the air motor. As shown such communication is afforded by means of a coaxially disposed tube 105 extending through the piston rod 95, the dashpot piston 87, and terminating at its forward end in the forward portion of the end cap bore 81. As shown, it is held rigid in the bore 81 by means of a retainer ring 106 and is thus movable axially with the motor 79. Suitable passages 107 and 108 in the forward and intermediate portions 80a and 80b of the motor end cap 80 are provided to supply the air from the end of the tube 105 to the air motor.

Fixed to the rear end of the tube 105, as by a cap 109, is a rod 110 which extends through a coaxial opening 111 in the housing end plug 101. This rod may conveniently serve as a stop carrier for operating poppet valves (not shown) for controlling the remote four-way air supply valve. For details of an arrangement of this sort, reference is made to the co-pending application of George S. Johnson, Serial No. 108,876, filed August 6, 1949, now Patent Number 2,607,197.

In order to provide rapid approach movement of the tool to a workpiece, means is provided for effectively by-passing the feed control regulator 93 by providing unrestricted communication between the forward and rear dashpot chambers 88 and 89. In accordance with this feature of the invention, this by-passing of the feed control regulator 93 is effected only until the cutting element D' engages the work W'. Thereafter the by-pass is closed, so that further flow of hydraulic fluid from the forward dashpot chamber 88 to the rear dashpot chamber 89, as advance of the tool is continued, is accomplished by way of the feed control regulator 93. The construction and arrangement is such, too, that when resistance to the advance of the cutting element D' decreases, as when the cutting element has penetrated the work, the by-pass is again opened so that rapid forward movement again obtains.

For this purpose in the instant form of the invention, passages 115 are provided through the dashpot piston 87 together with valve means for controlling the flow of fluid therethrough. In the present instance valving of the passages 115 is accomplished by providing a lost-motion connection between the piston assembly 87, 95 and 96 and the air motor end cap 80, with the latter being suitably fashioned to seat against the dashpot piston 87 to close the passages 115. To this end, the rear face of the end cap 80c is equipped with a gasket 116 for engagement with the front face of the dashpot piston 87. An expansion-type spring 118, received in the larger portion of the stepped bore 81 of the rear end portion 80c of the end cap 80, serves to normally maintain the rear end surface of such end cap portion, its gasket 116, and the forward face of the dashpot piston 87 spaced apart. The amount of such separation is limited by means of a suitable snap ring 119 carried by the tube 105 for engagement by the rear end of the piston rod 95.

It will be apparent that when there is little resistance to forward movement of the tool, as in approaching the work, the spring 118 serves to maintain the separation between the dashpot piston 87 and the rear face of the motor end cap portion 80c, thereby establishing unrestricted communication between the forward and rear dashpot chambers 88 and 89 by way of the passages 115. As soon as the cutting element D' engages the work, so that substantial resistance is offered to the advance of the tool, air pressure in the pressure chamber 98 of the air cylinder 75 acting on the air piston 96 forces the piston assembly 96, 95 and 87 forwardly with respect to the air motor 79, its end cap 80 and its air supply tube 105 with the result that the dashpot piston 87 is seated against the gasket 116 on the end face of the rear portion 80c of the motor end cap 80. As a result, communication between the forward and rear dashpot chambers 88 and 89 by way of the piston passages 115 is interrupted. As further advance of the tool continues by the action of compressed air on the air piston 96, flow of hydraulic fluid from the forward dashpot chamber 88 to the rear dashpot chamber 89 takes place by way of passages 90 and 91 and the feed control regulator 93, to the end that controlled slow feed of the cutting element D' obtains.

As soon as the cutting element penetrates the work, resistance to the advance thereof is substantially reduced. The spring 118 then effects a separation between the dashpot piston 87 and the motor end cap portion 80c so that the feed control regulator 93 is again by-passed with the result that rapid advance movement again obtains.

After the tool has completed its forward stroke and the remote four-way valve is operated to admit compressed air to the forward or "retract" pressure chamber 97 of the air cylinder 75, such compressed air acting on the forward face of the air piston 96 is effective to retract the tool and at the same time to cause the piston rod 95 to engage the snap ring 119. With the spring 118 serving to maintain the separation between the forward face of the dashpot piston 87 and the rear surface of the motor end cap portion 80c, the passages 115 in the dashpot piston 87 are open so that hydraulic fluid in the rear dashpot chamber 89 can flow freely through such passages to the forward dashpot chamber 88. As a result, the tool is moved at a rapid rate during its return stroke.

In carrying out other aspects of the invention, not only is provision made for automatically changing the rate of advance of the tool with respect to the work in response to the resistance offered by the work to the advance of the tool element thereof, but additionally provision is made in the control means for the tool for automatically effecting retraction of the tool element and thereafter restoration thereof into engagement with the work for continuing operation thereon. For example, in deep-hole drilling the tool spindle mounting a drill is rapidly advanced until the drill engages the workpiece at which time the rate of advance is changed to a slow-feed movement. As the drill penetrates the workpiece the advance of the drill might be impeded by the collection of chips in which case it is necessary to retract the drill to clear the chips and then return the same to cutting engagement with the work, such return movement being effected at the rapid approach rate until engagement of the drill with the bottom of the hole at which time slow-feed again obtains. It will be appreciated from the foregoing descriptions of the first two of the illustrative embodiments of the invention that the instant control provides for the rapid advance of the tool when there is relatively little resistance to such advance and that a slow-feed rate is effected when the resistance to the advance of the drill is increased. It will also be appreciated from the just recited deep-hole drilling example that resistance to the advance of the drill upon clogging with chips or for other reasons becomes substantially increased. It is this substantially increased resistance to advance of the tool that is in effect sensed by the instant control means which is then effective first to effect retraction of the cutting element from the work and thereafter to restore the cutting element to cutting engagement with the work.

Referring more particularly to Figs. 6 through 8, there is shown in an illustrative form of the invention. This tool is also of the type in which a cutting element such as a drill is mounted on the spindle of a motor which in turn is longitudinally slidable in a stationarily supported housing. In this instance a three-part housing 130 is provided which includes a forward section 131, a rear section 132, and an intermediate section 133. The forward section is of generally tubular form defining a main or feed cylinder 134 and a return cylinder 135, the two cylinders being separated by a transverse partition 136. Longitudinally slidable within the feed cylinder 134 is a motor 138 mounting a tool spindle having a tool receiving chuck on its forward end (not shown). The motor 138 is adapted to be reciprocated within the cylinder 134, and such movement is guided by suitable guide rings 138a rigid with the motor and constituting anti-friction bearing supports therefor. To reciprocate the motor 138 a pair of pistons 140 and 141 are provided. The piston 140 is received in the forward or feed cylinder 134 of the forward housing portion 131 and the piston 141 is received in the return cylinder 135. Thus they may be conveniently termed feed and return pistons, respectively. The two pistons are maintained in rigid spaced relation by means of a rod 142 which extends through the partition 136 and is suitably formed at its opposite ends for connection with the pistons. The feed piston 140 together with the feed cylinder 134 and the partition 136 define a forward pressure chamber generally designated 144. Similarly the return piston 141, the return cylinder 135 and the partition 136 define a rear pressure chamber 145.

Pressure fluid, such as compressed air, is admitted alternatively to the two pressure chambers 144 and 145 under the control of a valve indicated generally at 150. As shown, the valve 150 is carried by the forward housing section 131 being attached thereto adjacent the partition 136, and includes a housing longitudinally shiftable within which is a valve member 151 for controlling the admission of pressure fluid to and the exhaust of spent fluid from the chambers 144 and 145. Suitable ports 153 and 154 are provided in the partition 136 to interconnect the pressure chambers 144 and 145 with the valve 150. Thus with the shiftable valve member 151 of the valve 150 in one position pressure fluid is admitted to the forward pressure chamber 144 behind the feed piston 140 to advance the same forwardly in the cylinder 134. Simultaneously the rear pressure chamber 145 is vented to the atmosphere by way of a port 152. Alternatively, with the valve member of the valve 150 shifted into its other position, pressure fluid is admitted to the rear pressure chambers 145 to act against the return piston 141 to move it rearwardly so as to retract the motor. At the same time the feed piston chamber 144 is vented.

The motor 138 is coupled to the piston 140 by means of an end cap 155. This cap, as shown, is of stepped cylindrical form having a forward portion 155a which is received within the rear end ring 138a of the motor. Rearwardly of the forward portion 155a of the end cap is an enlarged portion 155b and a portion 155c of reduced diameter. The end cap 155 terminates at its rear end in an elongated rod-like portion 155d. The feed piston 140 and the piston rod 142 are suitably counterbored coaxially thereof for the reception of the end cap portions 155c and 155d, respectively.

In the present instance, forward movement of the feed piston 140 is imparted to the motor 138 by engagement of the piston with the rear face of a washer 156 carried by the motor end cap 155 about the intermediate portion 155c thereof, the forward face of which is in engagement with the rear face of the end cap portion 155b. Rearward motion, as effected by the rear piston 141, so as to retract the motor 138, is imparted thereto by engagement of the feed piston 140 with a retainer ring 157 carried by the end cap portion 155c in spaced relation to the rear face of the washer 156. As shown, the retainer ring comprises a simple radially extending snapring received in a suitable annular channel formed in the end cap portion 155c adjacent the rear end thereof.

In order to supply pressure fluid, such as compressed air, to actuate the motor, the end cap 155 is provided with a passage 158 which communicates by way of a port 159 with the forward pressure chamber 144 rearwardly of the feed piston 140. Thus the pressure fluid supplied to advance the tool is also conveniently used to actuate the motor 138.

The rate of advance of the feed piston 140 and of the motor 138 with the cutting element mounted thereon is under the control of a hydraulic dashpot indicated generally at 160. The dashpot comprises a cylinder 161, defined by the rear housing section 132, and a piston 162 reciprocable within the cylinder. The piston thus divides the dashpot cylinder 161 into forward and rear chambers 163 and 164. The cylinder is completely filled with hydraulic fluid such as light oil. The dashpot piston 162 is equipped with a suitable coaxially disposed rod 165 which extends through a central aperture 166 in an end plate 167 rigid with the rear housing section 132. The end plate 167 is equipped with suitable packing 168 to prevent leakage of the hydraulic fluid from the forward dashpot chamber 163.

The forward end of the dashpot piston rod 165 is rigidly secured to the air piston assembly 140, 141, and 142 so as to be movable therewith. For this purpose there is interposed between the piston 141 and the forward end of the dashpot piston rod 165 a piston rod extension 142A and a carrier 170. The piston rod extension 142A is coupled to the carrier 170 by means of an annular collar 171 disposed about the rear end of the extension 142A and within the forward end of the carrier 170. The forward end of the dashpot piston rod 165 is similarly connected to the rear end of the carrier 170 as indicated at 172.

Upon admission of pressure fluid behind the feed piston 140 to advance the same, the dashpot piston 162, too, is moved forwardly, and hydraulic fluid in the forward dashpot chamber 163 is forced therefrom to the rear dashpot chamber 164. For this purpose and to provide for an adjustable feed rate, restricted communication is provided between the two chambers. Thus the rear housing section 132 is provided with a generally longitudinal passage 175 communicating at its forward end with the forward end of the dashpot chamber 163. The rear end of the passage 175 communicates with a feed control regulating valve generally indicated at 176. Communication between the valve 176 and the rear dashpot chamber 164 is afforded by a passage 177.

Upon completion of a forward stroke, the tool is reversed, as will hereinafter be described, so as to retract the air piston assembly 140, 141 and 142 and the motor 138, by operation of the valve 150 to supply pressure fluid to the rear pressure chamber 145 to act on the return piston 141. So that a rapid return movement of the aforesaid elements obtains, the dashpot piston 162 is equipped with a check valve 180. The valve 180 is similar in construction and arrangement to the valve 60 in the first form of the invention described (Fig. 2). Thus upon forward movement of the piston 162 the valve 180 is closed by the seating against the piston. Upon return movement of the piston 162 the shiftable member of the valve 180 simply leaves its seat as a result of increased fluid pressure in the dashpot chamber 164, thereby establishing free communication for the passage of hydraulic fluid from the rear dashpot chamber 164 to the forward chamber 163 thereof.

Means is provided for rendering the dashpot ineffective to produce a slow feed rate when relatively little or no resistence is offered to the advance of the cutting element carried by the motor 138. For this purpose means is provided which effectively by-passes the feed control regulator 176 when there is relatively little resistance to the advance of the tool so as to provide unrestricted communication for the flow of hydraulic fluid from the forward dashpot chamber 163 to the rear dashpot chamber 164 (even though during such movement the dashpot check valve 180 is closed). Conversely, upon engagement of the tool with a workpiece and increased resistance to the advance of the tool is encountered, the control mechanism is effective to close such by-pass and to re-establish communication between the forward and rear dashpot chambers by way of the feed control regulator 176.

This portion of the control mechanism for the instant form of the invention is similar to that for the first of the illustrative tools. Thus it includes a system of passages establishing communication between the forward and rear dashpot chambers 163 and 164, respectively, and a valving rod 185 effective to control the flow of hydraulic fluid through the system of passages. The system of passages includes a central passage 186 disposed coaxially of the piston rods 142, 142A and 165 and transverse passages 187 and 188, intersecting the central passage 186 adjacent the rear end thereof and respectively on opposite sides of the dashpot piston 162. The transverse passages 187 and 188 extend through the dashpot piston rod 165 communicating respectively with the forward and rear dashpot chambers 163 and 164. The valve rod 185 is received in the passage 186 in the dashpot piston rod 165 and is normally biased forwardly with respect to the dashpot piston rod by means of a spring 189 interposed between the forward end of the dashpot piston rod and a head 185a rigid with the forward end of the valve rod. Thus the dashpot by-pass, as afforded by the system of passages 186, 187 and 188, is normally open, and the dashpot is normally ineffective.

In order to effect movement of the valve rod 185 within the passage 186 and thus with respect to the piston rods 142, 142A and 165, lost motion is provided in the connection between the actuator piston assembly including the feed piston 140 and the tool carrying motor 138. In the present instance, this lost motion is afforded by axially spacing apart the retainer ring 157 and the rear surface of the washer 156 which is carried by the intermediate end cap portion 155b and by appropriately forming the forward end portion of the feed piston 140 that is disposed about the motor end cap portion 155c.

An operative connection between the valve rod 185 and the motor end cap 155 is afforded by means of an operator rod 190 which is rigidly secured, as by screw-threading, to the rear end of the end cap portion 155d so as to be movable therewith axially within the forward portion of the passage 186 that extends through the piston rods 142 and 142A. Interposed between the rear end of the operator rod 190 and the valving rod head 185a is a spacer 191. It will be appreciated that forward movement of the operator rod 190 is accompanied by similar movement of the valve rod 185 by the action of the spring 189.

Interposed between the rear end of the motor end cap portion 155d and the bottom of the enlarged forward end of the coaxial passage 186 in the piston rod 142 is a spring 195 which serves, when there is relatively little resistance offered to the advance of the tool, to maintain the motor 138 and its end cap 155 forwardly with respect to the feed piston 140. Upon forward movement of the motor 138 and its end cap 155 the operator rod 190 is also moved forwardly, which movement is followed by the spacer 191 and the valve rod 185, by the action of the spring 189 with respect to the piston rods 142, 142A and 165. Such movement opens the dashpot by-pass passage system 187, 186, 188 so as to effect free communication between the forward and rear dashpot chambers 163 and 164 for the flow of hydraulic fluid and thereby by-passes the feed control regulator 176.

Upon engagement of the cutting element carried by the motor 138 with the work, its forward motion is momentarily stopped, sufficient resistance being offered to the advance thereof to overcome the force of the spring 195 acting on the rear surface of the motor end cap portion 155d. Fluid pressure in the chamber 144, however, continues forward movement of the feed piston 140 with the result that lost motion in the connection between the piston and the washer 156 is taken up and the piston assembly is moved forwardly relative to the motor end cap 155 until the feed piston engages the rear surface of the washer 156. Upon such relative movement of the piston assembly with respect to the motor the piston rods 142, 142A and 165 move correspondingly forward with respect to the operator rod 190, the spacer 191 and the valve rod 185, and the rear end of the valve rod 185 closes off the system of passages 187, 186 and 188. As a result, further advance of the tool by the action of the pressure fluid on the feed piston 140 is under the control of the feed control regulator 176. Since the by-pass passage system is closed, hydraulic fluid from the forward dashpot chamber 163 must pass through the line 175, 177 by way of the regulator 176 to the rear dashpot chamber 164 as the dashpot piston 165 advances with the air piston assembly 140, 142, 141 and 142A. Therefore, the tool is advanced at a slow-feed rate as determined by the setting of the feed control regulator 176.

When the cutting element carried by the motor has penetrated the first portion or layer of the work, the resistance to its forward movement is substantially reduced, thus the spring 195 again becomes effective to move the motor end cap 155 forwardly with respect to the air piston assembly 140, 142, 141 and 142A until the retainer ring 157 engages the feed piston 140. This relative movement between the motor end cap and the air piston assembly produces a corresponding relative movement of the operator rod 190, and the spacer 191 and the valve rod 185 under the action of the spring 189. As a result the dashpot by-pass passage system 187, 186, 188 is opened and unrestricted communication between the forward and rear dashpot chambers 163 and 164 is re-established and advancing movement of the tool proceeds at the rapid-approach rate toward engagement with the next relatively hard portion of the workpiece.

Upon engagement of the cutting element carried by the motor 138 with the next relatively hard layer of the workpiece, the previously described action is repeated and a change from rapid-approach movement to slow-feed is again effected.

In carrying out another important aspect of the invention, means is provided which is responsive to resistance to advance of the tool which is substantially greater than that offered under normal feeding conditions for automatically retracting the cutting element from the work and subsequently returning the same into cutting engagement. For this purpose in the illustrative tool the control mechanism includes means providing a second stage of lost motion in the connection between the feed piston 140 and the motor 138 together with means utilizing such additional lost motion for operating the control valve 150 to first retract the tool and then to return the same to cutting engagement with the work.

To provide the additional lost motion in the connection between the forward air piston 140 and the motor 138, the washer 156, which is carried by the motor end cap 155, is made compressible. Therefore, when resistance to advance of the tool is substantially increased over that encountered at normal feed rate (as might be caused, for example, by clogging with chips of a drill carried by the motor), the fluid pressure in the forward pressure chamber 144 acting on the feed piston 140 causes the latter to compress the washer between the feed piston and the motor end cap portion 155b so as to deform the washer 156 and effect further forward movement of the air piston assembly 140, 142, 141, etc. with respect to the motor 138 and its end cap 155. As a result there is a similar movement thereof with respect to the operator rod 190 and the spacer 191. This additional lost motion is utilized through a system of levers generally indicated at 200 to actuate a poppet valve 202 which is operatively connected to the control valve 150 so as to effect a shift of the latter into the return position. When the control valve is shifted into the return position, pressure fluid is supplied to the rear air chamber 145 to act on the piston 141 to retract the tool from the work.

In the present instance the system of levers includes a poppet operator lever 203, an intermediate lever 204 and a pick-up lever 205. The poppet operator lever is pivotally supported for movement about an axis disposed longitudinally with respect to the tool as defined by hinge brackets 206 mounted on the intermediate housing section 133. The pick-up lever 205 and the intermediate lever 204 are supported on a pivot pin 208 for movement about a transverse axis. The pivot pin 208 is suitably supported on the carrier 170. The pick-up lever is equipped with a pair of angularly disposed arms 205a and 205b. The former is received in a notch 191a in the spacer block 191 which is interposed between the rear end of the operator rod 190 and the forward end of the valve rod 185. The other arm 205b of the pick-up lever is adapted to engage an adjusting screw 204A carried by the intermediate lever 204. It will be noted that the pick-up lever 205 and the intermediate lever 204 move longitudinally with the actuator piston assembly. So that these levers can effect operation of the poppet operator lever 203 at any point in the stroke of the tool, the latter lever is of elongated form, and the intermediate or transfer lever 204 is in sliding engagement therewith.

In order to permit a change in the rate of advance from rapid-approach movement to slow-feed movement without effecting operation of the lever system to actuate the back-out poppet 202 and thus the control valve 150, lost motion is provided between the pick-up lever 205 and the intermediate lever 204. As shown, this lost motion is provided by appropriately spacing the inner end of the adjusting screw 204A of the lever 204 and the arm 205b of the pick-up lever 205. It will be seen that initial forward movement of the carrier 170 and with it the pivot pin 208 with respect to the operator rod 190, the spacer 191 and the valve rod 185, upon initial engagement of a cutting element carried by the motor 138, produces an initial clockwise movement of the pick-up lever 205 so as to take up the lost motion between the pick-up lever 205 and the intermediate lever 204. So long as only normal resistance to the advance of the tool is encountered during feeding of the cutting element into the work, there is little or substantially no deformation of the washer 156 and thus no further relative movement between the actuator, piston assembly 140, 141, etc. and the operator rod 190 and the spacer 191. Thus there is no further relative movement between the carrier 170 and the lever system operating spacer 191. Therefore, advance of the tool continues at the slow-feed rate as determined by the regulator 176. However, upon an increase in the resistance to the advance of the tool, as would be encountered by the cutting element becoming clogged with chips, air pressure in the chamber 144 causes the feed piston 140 to compress the washer 156 with a resulting forward movement of the actuator piston system with respect to the motor 138, its end cap 155, the operator rod 190 and the lever system operating spacer 191. Since the lost motion between the pick-up lever 205 and the intermediate lever 204 was previously taken up, this further forward movement of the carrier 170 with respect to the spacer 191 results in a further clockwise movement of the pick-up lever 205. A similar movement of the intermediate lever 204 is thus effected with the result that the back-out poppet operating lever 203 is rotated on its axis so as to operate the back-out poppet 202.

Operation of the poppet valve 202 causes the control valve 150 to shift to the return position so that pressure fluid is supplied by way of the passage 154 to the rear air chamber 145 behind the piston 141. When this occurs return movement of the air piston assembly is initiated.

By the action of the springs 195 and 189, relative movement between the actuator piston assembly, including the carrier 170, and the operator rod 190, the spacer 191, and the valve rod 185 obtains until the feed piston 140 engages the retainer ring 157. This relative motion results in an opening of the dashpot by-pass passage system 188, 186, and 187, establishing unrestricted communication between rear and forward dashpot chambers 164 and 163, respectively. As a result, the tool is rapidly returned and its cutting element is withdrawn from the work. This permits the cutting element to clear itself of chips, for example.

In order to restore the cutting element to cutting engagement with the work to continue operation thereon, means operable at the end of the return stroke of the tool is provided for re-establishing advance movement of the tool. As shown this means includes a poppet valve 210 which is mounted on the outer end of a bracket 211 which in turn is rigid with the rear housing section 132. In order to actuate the poppet the carrier 170 is provided with a stop arm 212 which extends radially outward with respect to the tool through an opening in one side of the intermediate housing section 133. Adjacent its outer end the arm 212 is equipped with an adjustable screw 212a, one end of which is adapted for engagement with the poppet 210 when the tool, or more particularly the carrier 170 of the actuator piston assembly of the tool, has completed its full return stroke.

The poppet 210 is suitably connected, as by a hose 213 to the control valve 150. Upon operation thereof the control valve is shifted from the return position to the advance position to the end that advance movement of the tool again obtains.

It will be recalled that upon initiation of the back-out or return movement of the motor and actuator piston assembly, the operator rod 190, the spacer 191, and the valve rod 185 were shifted so as to open the dashpot by-pass passage system 187, 186 and 188. When advance movement of the tool is initiated, therefore, the dashpot by-pass passage system is already open. Since the tool is out of engagement with the work substantially little or no resistance is offered to such advance movement. Therefore, the tool advances at the rapid-approach rate toward restoration of engagement of the cutting element with the work to continue operation thereupon. It is important to note that this advance movement at the rapid-approach rate continues until engagement between the tip of the cutting element and the work again obtains. Thus if the cutting element is a drill, the drill is advanced rapidly into the work and all the way to the bottom of the partially drilled hole at the rapid-approach rate. Thereafter the instant control means is effective to automatically alter the rate of advance to slow-feed as previously described. Such slow-feed movement continues until the operation on the workpiece is completed, or until increased resistance is again encountered whereupon the foregoing sequence of events is repeated.

In carrying out still another aspect of the present invention, the feed control for the tool is provided with means for limiting the forward stroke of the tool, for effecting a return movement thereof to withdraw the cutting element carried by the tool from the work, and to stop the operation of the tool in retracted position. Thus, upon completion of the operation on the workpiece, as for example the complete penetration thereof, or the attainment of a desired depth in so-called "blind hole" drilling, the present control means has incorporated therein forward stroke limiting means which is effective additionally to shift the control valve 150 to the return position and to interrupt the supply of air to the tool so that upon its return further operation thereof is stopped.

Referring particularly to Fig. 6, it will be seen that the tool there shown is equipped with a stop rod 215 which is disposed longitudinally with respect to the tool being supported adjacent the rear end of the intermediate housing section 133 in the bracket 211 and adjacent the forward end thereof in a bracket 216. Between the brackets 211 and 216, the stop rod 215 passes through an aperture 217 in the arm 212 of the carrier 170.

The stop rod is arranged to actuate a poppet valve which is adapted to control the operation of an on-off valve interposed in the air line between the supply passage 153 to the forward air cylinder 134 and the supply port therefor of the control valve 150. Thus supported on the intermediate housing section 133 is a poppet valve 220 which is disposed opposite the forward end of the stop rod 215 for actuation thereby. The poppet 220 is connected as by a hose 221 to one end of a valve 222. The valve 222, as shown, is similar in form to the control valve 150 but is arranged (as by plugging one exit port thereof) simply as an "on-off" valve. The supply port for this valve is connected to the forward exit port of the control valve 150 and the other exit port thereof is connected to the outer end of the supply passage 153 for the forward air pressure chamber 144 in the forward housing section 131.

To interpose the valve 222 between the forward port of the valve 150 and the supply passage 153 to the forward air chamber 144, as shown, there is provided between the casing of the valve 150 and the forward housing section 131, a block 223 having through-passages 224 and 225 therein providing communication respectively between the return and the exhaust ports in the housing of the control valve 150, and between the return air chamber supply passage 154 and the exhaust passage in the forward housing portion 131. Additionally, the block 249 is provided with a pair of forwardly opening passages 226 and 227, the rear ends of which register respectively with the forward port in the housing of the control valve 150 and the forward air chamber supply passage 153. The forward ends of the passages 226 and 227 are suitably adapted for the reception of hose connections by means of which communication is established with the valve 222. Thus, by the line 228 the passage 226 is connected to the inlet port of the valve 222, and the passage 227 is connected to the forward exit passage of the valve by the line 229. As previously noted, operation of poppet valve 220 is effective to produce a shift of the valve 222 into the off-position. In order to effect a shift of the valve 222 into the on-position it is equipped with a suitable manually operable poppet 222A.

In order to operate the poppet 220 the stop rod is made axially shiftable in the brackets 211 and 216, and it is arranged to be shifted by the carrier arm 212. Thus the stop rod is equipped with forward and return stroke limit stops 230 and 232, respectively. These stops are preferably of split-collar form so as to clamp on the stop rod and to permit adjustment of their positions thereon. The stop rod 215 is normally biased rearwardly with respect to the brackets 211 and 216 by means of a spring 234 which is interposed between a retainer ring 235 carried by the stop rod and the rear face of the bracket 216. Rearward motion of the stop rod with respect to the brackets is normally limited by engagement of its headed forward end portion with the front surface of the bracket 216. From the foregoing it will be seen that when the tool is advanced the carrier 170 is moved forwardly and its arm 212 is moved forwardly with respect to the stop rod 215 toward engagement with the forward stroke limit stop 230. Upon engagement of the carrier arm 212 with the stop 230, since the latter is clamped to the stop rod 215, the stop rod is moved forwardly into engagement with the poppet 220 to operate the same. Rearwardly of the bracket 211 the stop rod is screw-threaded and has received thereon a suitable stop nut 236 which is engageable with the rear face of the bracket 211 so as to limit forward movement thereof and thus mechanically limit the forward stroke of the tool. The stop nut 236 may conveniently be provided with a graduated scale 237 for co-operation with an index (not shown) on the bracket 211 to provide for extremely accurate forward stroke length adjustment.

The return stop 232 is engaged by the rear face of the carrier arm 212 in the return movement of the tool and serves to limit the return stroke. Normally the rear face of the stop 232 is in engagement with the front face of the bracket 211 under the action of the stop rod biasing spring 234.

After opening of the poppet 220 by the stop rod 215, when the same is moved forwardly upon engagement of the carrier arm 212 with the forward stroke limit stop 230, the tool is fully retracted to the position shown in Fig. 6. This is the normal rest position of the tool. In this position the forward poppet 210 is held open by the carrier arm 212.

Summary of operation

With the tool in rest position and its actuator piston assembly 140, 142, 141, etc. retracted and the carrier arm 212, by its adjusting screw 212a, holding open the forward poppet 210, application of air to the tool by way of the main air supply line to the control valve 150 causes the control valve 150 to be shifted into the forward position. To initiate operation of the tool, the push-button start poppet 222A is operated so as to permit shifting of the on-off valve 222 into the on-position. This establishes communication between the forward exit port of the control valve 150 and the forward air chamber 144 behind the feed piston 140. The tool is then advanced toward the work. This advance movement takes place at the rapid-approach rate since there is substantially no resistance thereto and the motor 138 is held in advance of the actuator piston assembly 140, 142, 141, 142A, 191 and 165 by the action of the spring 195. Upon engagement with the work of the cutting element carried by the tool, forward motion of the cutting element and the motor 138 is momentarily interrupted and the first stage of lost motion in the connection between the air piston assembly and the motor end cap 155 is taken up as the feed piston 140 moves into engagement with the washer 156. This relative forward movement of the air piston assembly with respect to the motor and thus with respect to the operator rod 190, the spacer 191 and the valve rod 185, causes the dashpot by-pass passage system 187, 186 and 188 to be closed and also causes the lost motion between the pick-up lever 205 and the intermediate lever 204 to be taken up.

With the closure of the dashpot by-pass passage system by the valve rod 185, pressure fluid flow from the forward to the rear dashpot chamber is by way of the feed control regulator 176 with the result that advance of the tool continues at the slow-feed rate as determined by the setting of the feed control regulator.

Upon encountering substantially increased resistance to advancing movement, as compared to that encountered under normal feeding condition, the feed piston 140 effects a compression of the washer 156 and thus takes up the second stage of lost motion in the connection between the piston 140 and the end cap 155, moving further forward with respect to the motor 138, its end cap 155, the operator rod 190 and the spacer 191. This further forward movement effects a further clockwise movement of the pick-up lever 205. Since the lost motion between the pick-up lever 205 and the intermediate lever 204 was taken up by the initial movement of the lever 205, the additional forward movement of the actuator piston assembly with respect to the spacer 191 results in a clockwise rotation of the intermediate lever 204. As a result, because of its engagement therewith, the lever 203 is rocked so as to actuate the back-out poppet 202. The back-out poppet 202 is connected by a line 240 with the forward end of the housing of the control valve 150. Operation of the poppet 202 thus relieves pressure on the forward end of the valve 151 causing a shifting thereof to the return position, so as to effect communication between the main air supply to the tool, by way of the passage 154, to the rear air chamber 145 to act on the return piston 141. Simultaneously the forward air chamber 144 is connected to exhaust. Upon initiation of return movement of the air piston assembly the spring 195 is effective to delay initiation of return movement of the motor end cap 155 and the motor 138 until the forward air piston 140 engage the retainer ring 157. As a result the operator rod 190 is moved forwardly with respect to the air piston assembly 140, 141, etc., and the spring 189 causes a following forward movement of the spacer 191 and the valving rod 185 with respect to the actuator piston assembly. Thus the dashpot by-pass passage system 188, 186 and 187 is opened permitting free communication between the rear and forward dashpot chambers 164 and 163, respectively. As a result, return movement of the tool is effected at a rapid rate.

Return movement continues until the carrier 170 and its arm 212, which are rigid with the actuator piston assembly, are returned to the position shown in Fig. 6, in which position the forward poppet 210 is opened. Upon opening of the forward poppet 210, the control valve 150 is again shifted into the advance position thereof so that advance movement of the tool again obtains. Such advance movement will be at the rapid-approach rate until the cutting element carried by the tool is restored to cutting engagement with the work. Upon re-engagement of the cutting element with the work there is again effected a change of the speed of advance from the rapid-approach rate to the slow-feed rate as determined by the setting of the regulator 176.

It will be seen, therefore, that a change in feed rate between rapid-approach and slow-feed, back-out and restoration to cutting engagement obtains by means of the instant feed control directly in response to the amount of resistance encountered in the movement of the tool.

Upon completion of the operation on the work and the full forward stroke of the tool has been completed, the arm 212 of the carrier 170 engages the forward stroke limit stop 230 carried by the stop rod 215. This causes the stop rod 215 to be moved forwardly into engagement with the poppet 220 so as to operate the same. Operation of the poppet 220 causes the on-off valve 222 to shift into the off-position and thus prevents further application of pressure fluid to the forward chamber 144 behind the piston 140 so as to prevent further forward movement of the tool.

In order to effect a return movement of the tool so as to withdraw the cutting element from the work after completion of the drilling operation, the return poppet 220 is also connected by a line 242 to the forward end of the control valve 150. This line 242 may thus be conveniently cross-connected as by a line 243 with the line 240 which, as previously set forth, is connected to the forward end of the casing of the control valve 150. With this arrangement, upon operation of the return poppet 220 not only is the on-off valve 222 shifted into the off-position but also the control valve 150 is shifted into the return position. As a result, pressure fluid is supplied from the control valve to the return air chamber 145 behind the piston 141 to retract the tool.

To prevent shifting of the on-off valve 222 into the off-position upon operation of the back-out poppet 202, or in other words so that shifting of the valve 222 into the off-position is effected only upon operation of the return poppet 220, a check valve 245 is included in the cross-connecting line 243 between the lines 240 and 242.

Since the valve 222 is shifted into the off-position upon operation of the return poppet 220 and thus interrupts the flow of pressure fluid to the forward air chamber 144 from the control valve 150 even though the forward poppet 210 is operated at the end of the return stroke so as to effect a shift of the control valve 150 into the advance position, the tool will remain in its fully retracted, rest position (Fig. 6). Such fully retracted position is maintained until the push-button start poppet 222A is again manually operated to cause a shift of the on-off valve 222 to the on-position to re-establish air supply to the forward air chamber 144 behind the piston 140.

I claim as my invention:

1. In a pressure fluid operated tool, the combination comprising a spindle for mounting a tool element, pressure fluid operated means for advancing and retracting said spindle, means providing impedance to advance of the spindle and tool element, means for controlling said impedance including a valve having fast and slow positions corresponding to fast and slow rates of advance of the spindle and tool element with respect to a workpiece, and means reactive to a predetermined amount of resistance encountered by the tool element during advance thereof towards a workpiece for moving said valve to the slow position when the tool element is in engagement with said workpiece and for moving the valve to the fast position when the resistance is substantially reduced, so that the tool advances rapidly into contact with the workpiece.

2. In a pressure fluid operated tool of the type having a spindle for mounting a tool element and means for advancing and retracting said spindle, the combination of means providing impedance to advancing said spindle to obtain a measured rate of advance for feeding movement of the tool element with respect to a workpiece, with means reactive to the amount of resistance encountered by the tool element upon engagement with the workpiece for rendering said impedance effective when the tool element is in engagement with the workpiece and for rendering the same ineffective when the resistance presented by the workpiece to advance of the tool element is substantially reduced so that rapid advance obtains.

3. In a pressure fluid operated tool, the combination comprising a spindle for mounting a tool element, pressure fluid responsive means for advancing and retracting said spindle, means providing impedance to advancing said spindle including a hydraulic dashpot for obtaining a measured rate of advance for feeding movement of the tool element with respect to a workpiece, and means reactive to the amount of resistance encountered by the tool element upon engagement with the workpiece for rendering said dashpot effective when the tool element is in engagement with the workpiece and for rendering the same ineffective when the resistance presented by the workpiece to advance of the tool element is substantially reduced so that rapid advance obtains.

4. In a pressure fluid operated tool, the combination comprising a motor driven spindle for mounting a tool element, pressure fluid means for advancing and retracting said spindle, means providing impedance to advancing said spindle including a dashpot operably coupled to said spindle and a feed control regulating valve therefor, said last named means controlling the rate of advance for feeding movement of the tool element with respect to a workpiece, and means responsive to the amount of resistance encountered by the tool element upon engagement with the workpiece for rendering said regulating valve effective when the tool element is in engagement with the workpiece and relatively substantial resistance to advance movement is encountered and for by-passing said valve and rendering said valve ineffective when the resistance presented by the workpiece to advance of the tool element is substantially reduced so that rapid advance obtains.

5. In a pressure fluid operated tool of the type having a motor and a housing defining a motor chamber, an air cylinder and a dashpot cylinder, and having a feed control regulator interposed between the ends of said dashpot cylinder, the combination of a piston assembly including an air piston in the air cylinder for advancing the motor and a dashpot piston in the dashpot cylinder and rigid with said air piston, a lost motion connection between said assembly and the motor affording alternative relative positions thereof, means providing a by-pass for the regulator, valve means for said by-pass responsive to the relative positioning of the motor and said assembly, and means for maintaining the motor and said piston assembly in one of said positions when there is relatively little resistance to the advance of the motor and for permitting the motor and said piston assembly to assume the other of said positions when substantial resistance to advance of the motor is encountered, said valve means opening said by-pass in said one position to effect rapid advance of the motor and said piston assembly, and said valve means closing said by-pass in said other position to effect a slow feed under the control of the regulator.

6. In a compressed air operated tool of the type having a motor driven spindle for mounting a tool element, the combination of a multiple piston assembly including a first air piston for advancing the spindle, a second air piston for retracting the spindle, a dashpot including a cylinder and piston in the cylinder dividing the same into two chambers, and a piston rod connecting said pistons in rigid spaced relation and having a bore therethrough, means providing a lost motion connection between said piston and rod assembly and the spindle affording alternative relative positions thereof, a feed control regulating valve interposed between the two dashpot chambers for controlling the rate of advance of said piston assembly and the motor, said piston and rod assembly having passage therein including a portion of said piston rod bore between said dashpot chambers affording unrestricted communication therebetween, means including a valve element movable with the spindle and with respect to said assembly for controlling dashpot fluid flow through said passage, and means effective when there is relatively little resistance to the advance of the tool element for holding the spindle and said assembly in one of their relative positions and effective upon engagement of the tool element with a workpiece to permit the spindle and said piston assembly to assume the other of said positions, said valve means being open in said one position and closed in said other position whereby dashpot fluid flow is alternatively by way of said passage or by way of said feed control regulating valve for rapid advance or slow-feed movement of the tool element.

7. In a compressed air operated tool of the type having a motor driven spindle for mounting a tool element, the combination of a multiple piston assembly including a first air piston in the motor chamber for advancing the spindle, a second air piston for retracting the spindle, a dashpot cylinder and a piston therein dividing the same into two chambers, and a piston rod connecting said pistons in rigid spaced relation, means providing a lost motion connection between said piston assembly and the spindle affording alternative relative positions thereof, a feed control regulating valve interposed between the two dashpot chambers for controlling the rate of advance of said piston assembly and the spindle, said piston assembly having a passage therein between said dashpot chambers affording unrestricted communication therebetween, valve means for said passage rigid with respect to the spindle, and air actuated means interposed between said assembly and said spindle effective when there is relatively little resistance to the advance of the tool element for holding the motor and said piston assembly in one of their relative positions and effective upon engagement of the tool element with a workpiece and resistance to the advance of the tool element is substantially increased to permit the spindle and said assembly to assume the other of said positions, said valve means being open in said one position and closed in said other position whereby dashpot fluid flow is alternatively by way of said passage or by way of said feed control regulating valve for rapid-advance or slow-feed movement of the tool element.

8. In a compressed air operated tool of the type having a motor driven spindle for mounting a tool element, the combination of a multiple piston assembly including a first air piston for advancing the spindle, a second air piston for retracting the spindle, a dashpot cylinder and a piston therein dividing the same into two chambers, and a piston rod connecting said pistons in rigid spaced relation, means providing a lost motion connection between said piston assembly and the spindle affording alternative relative positions thereof, a feed control regulating valve interposed between the two dashpot chambers for controlling the rate of advance of said piston assembly and the spindle, said assembly having a passage therein between said dashpot chambers affording unrestricted communication therebetween, valve means for said passage rigid with respect to the spindle, and air actuated means interposed between said piston assembly and said spindle including a piston element of smaller effective area than said first mentioned piston and rigid with respect to said spindle and a cylinder element defined by said assembly and communicating with the source of compressed air to said first air piston, said means being effective when there is little resistance to the advance of the tool element for holding the motor and said assembly in one of their relative positions and effective upon engagement of the tool element with a workpiece when there is increased resistance to the advance of the tool element to permit the motor and said assembly to assume the other of said positions, said valve means being open in said one position and closed in said other position whereby dashpot fluid flow is alternatively by way of said passage or by way of said feed control regulating valve for rapid-advance or slow-feed movement of the tool element.

9. In a compressed air operated tool of the type having a motor driven spindle for mounting a tool element, the combination of a multiple piston assembly including an air piston for advancing and retracting the spindle and its tool element, a dashpot cylinder and a piston therein dividing the same into two chambers, and a piston rod connecting said pistons in rigid spaced relation, means providing a lost motion connection between said piston assembly and the spindle affording alternative relative positions thereof, a feed control regulating valve interposed between the two dashpot chambers for controlling the rate of advance of said piston assembly and the spindle, said assembly having a passage therein between said dashpot chambers affording unrestricted communication therebetween, valve means for said passage including an element rigid with respect to the spindle, and spring means interposed between said piston assembly and the spindle effective when there is little resistance to the advance of the tool element for holding the motor and said assembly in one of their relative positions and operative upon engagement of the tool element with a workpiece to permit the motor and said assembly to assume the other of said positions, said valve means being open in said one position and closed in said other position whereby dashpot fluid flow is alternatively by way of said passage or by way of said feed control regulating valve for rapid-advance or slow-feed movement of the tool element.

10. In a compressed air operated tool of the type having a motor for driving a tool element and having a housing defining a dashpot cylinder and defining a motor chamber and an air cylinder adapted for alternative connection with a source of compressed air, the combination of a multiple piston assembly including a first air piston in the motor chamber for advancing the motor, a second air piston in the air cylinder for retracting the motor, a dashpot piston in the dashpot cylinder dividing the same into two chambers, and a piston rod connecting said pistons in rigid spaced relation, means providing a lost motion connection between said assembly and the motor affording alternative relative positions thereof, a feed control regulating valve interposed between the two dashpot chambers for controlling the rate of advance of said piston assembly and the motor, said assembly having a passage therein between said dashpot chambers affording unrestricted communication therebetween, valve means for said passage rigid with the motor, and means effective when there is little resistance to the advance of the tool element for holding the motor and said assembly in one of their relative positions and effective upon engagement of the tool element with a workpiece to permit the motor and said assembly to assume the other of said positions, said valve means being open in said one position and closed in said other position whereby dashpot fluid flow is alternatively by way of said passage or by way of said feed control regulating valve for rapid-advance or slow-feed movement of the tool element.

11. A pressure fluid operated tool comprising, in combination, a motor for driving a tool element, a housing for said motor defining air and dashpot cylinders, a piston assembly including a first piston reciprocable in said air cylinder and a second piston reciprocable in said dashpot cylinder and dividing the same into two chambers, said pistons being held in rigid spaced relation, feed control regulating means interposed between said dashpot chambers, means defining a by-pass for said feed control regulating means, and means operatively connecting said motor and said piston assembly for advancing said motor with respect to said housing, said connecting means affording a lost motion between said motor and said piston assembly, and means including a valve element rigid with said motor for controlling said by-pass and responsive to the relative positions of said motor and piston assembly as determined by the resistance to the advance of the tool element.

12. A pressure fluid operated tool comprising, in combination, a motor for driving a tool element, a housing for said motor, said housing defining air and dashpot cylinders with the former being adapted for connection with a source of compressed air, a piston assembly including a first piston reciprocable in said air cylinder and a second piston reciprocable in said dashpot cylinder and dividing the same into two chambers, said piston being held together in rigid spaced relation, means yieldably connecting said motor and said piston assembly for advancing said motor with respect to said housing, regulating means interposed between said dashpot chambers for controlling the flow of hydraulic fluid from one to the other of said chambers to control the rate of advance of said piston assembly, and means effective to by-pass said regulating means when there is little resistance offered to the advance of said motor so that rigid advance of the tool obtains, said last mentioned means being effective upon engagement of the tool element with a workpiece to render said regulating means operative.

13. In a pressure fluid operated tool of the type having a motor for driving a tool element, an air piston for advancing the motor and its tool element and a hydraulic dashpot for controlling the rate of advance of the piston and motor, the combination of a regulating valve interposed between the chambers of the dashpot for controlling the flow of hydraulic fluid therebetween upon advance of the dashpot piston, means defining a passage providing unrestricted communication between the dashpot chambers and by-passing said regulating valve, means movable with the motor for valving said passage, and means affording a lost motion connection between the motor and the air piston so that air applied to said piston to advance the same prior to engagement of the tool element with a workpiece is effective to simultaneously advance said motor to take up slack in said connection in one direction and render said valving means effective to open said by-pass passage for rapid approach movement of the tool, and so that air applied to said piston upon engagement of the tool element with the workpiece is ineffective to hold the motor in advance of the piston to the end that slack in said connection is taken up in the opposite direction and said valving means effectually closes said by-pass passage and effects fluid flow between the dashpot chambers by way of said regulating valve for slow-feed movement of the tool.

14. In a pressure fluid operated tool, the combination comprising a spindle for mounting a tool element, pressure fluid operated means for advancing and retracting said spindle, a reversing valve having advance and retract positions for controlling the admission of pressure fluid to said advancing and retracting means, means including a valve having a slow and fast positions for controlling the rate of advance of the spindle and tool element with respect to a workpiece, and means responsive to the amount of resistance encountered by the tool element upon engagement with the workpiece for moving said valve to the slow position when the tool element is in engagement with the workpiece and relatively substantial resistance to advance movement is encountered for effecting slow-feed thereof, for moving the valve to the fast position when the resistance presented by the workpiece to advance of the tool element is substantially reduced to effect rapid-advance of the tool telement, and for effecting operation of said reversing valve to the return position to retract the tool element from engagement with the work when the resistance to advance thereof is substantially increased over that encountered under normal feeding conditions.

15. In a pneumatically operated tool, the combination comprising a rotatable spindle for mounting a tool element, means for rotating said spindle and thus the tool element, pneumatically operated means for effecting advancing and retracting movement of said spindle, a control valve having advance and retract positions for controlling the admission of air under pressure to said advancing and retracting means, means providing impedance to the movement of said spindle including a valve for controlling said impedance for regulating the rate of such movement of the spindle and tool element with respect to a workpiece, and means including an element shiftable in response to the amount of resistance to advance movement encountered by the tool element upon engagement with the workpiece for controlling said regulating means and said control valve.

16. A fluid pressure operated tool comprising, in combination, a rotary spindle mounting a tool element for movement toward and from the work, a pressure fluid actuator for advancing the spindle to the work, a main valve for controlling the supply of pressure fluid to said actuator and operating to govern the direction of the movement of the spindle, hydraulic means governing the rate of advance of the spindle by said actuator including a valve device, and a control mechanism including an element shiftable in response to engagement of the tool element with the work and momentary increase in amount of resistance encountered by the tool element to effect the actuation of said valve device, said element being additionally operative in response to a further predetermined increase in the resistance to the advance of the tool element to effect actuation of the main control valve and withdrawal of the tool element from the work.

17. In a pressure fluid operated tool, the combination comprising a spindle for mounting a tool element, a pressure fluid operated motor for rotating said spindle, pressure fluid operated means for advancing and retracting said spindle, a control valve having advance and return positions for controlling the admission of pressure fluid to said advancing and retracting means, means operative in response to resistance to the advance of the tool element in excess of that encountered under normal feeding of the tool element into the work for shifting said control valve into the return position to withdraw the tool from the work, means operative upon withdrawal of the tool to a predetermined point for shifting said control valve into the advance position to effect re-engagement of the tool element with the work so as to continue the operation thereon, and means for limiting the distance of advance of the spindle and for returning and stopping the same and said motor with the spindle at said predetermined point, said latter means including stop means one of which is connected to said spindle engageable at the limit of advance of the spindle and operative upon such engagement for shifting the control valve into the return position to withdraw the tool from the work, and valve means conditioned by said stop means upon such engagement to be operative during the return stroke for interrupting the supply of pressure fluid to said advancing means and said motor to stop the latter, and to prevent re-advance of the spindle by stopping the same at said predetermined point.

18. In a pressure fluid operated tool, the combination comprising a spindle for mounting a tool element, a pressure fluid operated motor for rotating said spindle, pressure fluid operated means for advancing and retracting said spindle, a contorl valve having advance and return positions for controlling the admission of pressure fluid to said advancing and retracting means, means operative in response to resistance to the advance of the tool element in excess of that encountered under normal feeding of the tool element into the work for shifting said control valve into the return position to withdraw the tool from the work, means operative in response to the spindle reaching a predetermined retracted position for shifting the control valve to the advance position to effect re-engagement of the tool element with the work so as to continue the operation thereon, means including interengaging stops one of which is reciprocable with said spindle for limiting advancing movement of said spindle, and means operative in response to the engagement of said stops for shifting said control valve into the return position whereby said tool element is withdrawn from the work and for interrupting the supply of pressure fluid to said advancing means and to said motor to prevent advance of the spindle upon shifting of the control valve to the advance position upon the spindle reaching said predetermined retracted position whereby the spindle and motor is stopped with the spindle at said retracted position.

19. In a pressure fluid operated tool, the combination comprising a spindle for mounting a tool element, pressure fluid operated means for advancing and retracting said spindle, a reversing valve having advance and return positions for controlling the admission of pressure fluid to said advancing and retracting means, means including a valve having slow and fast positions for controlling the rate of advance of the spindle and tool element with respect to a workpiece, means responsive to the amount of resistance encountered by the tool element for moving said valve toward the slow position when the tool element is in engagement with the workpiece for effecting slow feed thereof, for moving the valve to the fast position when the resistance is substantially reduced to effect rapid advance thereof, and for effecting operation of said reversing valve toward the return position to back the tool element out of engagement with the work when the resistance is substantially increased over that encountered under normal feeding conditions, means operative upon withdrawal of the tool for shifting said reversing valve into the advance position to effect re-engagement of the tool element with the work to continue the operation thereon, means including inter-engaging stops one of which is reciprocable with said spindle for limiting advancing movement of said spindle, and means operative upon engagement of said stops for shifting said reversing valve into the return position and for interrupting the supply of pressure fluid to said advancing and retracting means whereby the tool element is withdrawn from the work and the spindle is stopped in a retracted position.

20. In a pressure fluid operated tool, the combination comprising a spindle for mounting a tool element, pressure fluid operated means for advancing and retracting said spindle, a reversing valve having advance and return positions for controlling the admission of pressure fluid to said advancing and retracting means, means including a valve having slow and fast positions for controlling the rate of advance of the spindle and tool element with respect to a workpiece, means responsive to the amount of resistance encountered by the tool element for moving said valve toward the slow position when the tool element is in engagement with the workpiece for effecting slow feed thereof and for moving the valve to the fast position when the resistance is substantially reduced to effect rapid advance thereof, means including inter-engaging stops one of which is reciprocable with said spindle for limiting advancing movement of said spindle, and means operative upon engagement of said stops for shifting said reversing valve into the return position and for interrupting the supply of pressure fluid to said advancing and retracting means whereby the tool element is withdrawn from the work and the spindle is stopped in a retracted position.

21. In a pressure fluid operated tool, the combination comprising a spindle for mounting a tool element, pressure fluid operated means for advancing and retracting said spindle, a reversing valve having advance and return positions for controlling the admission of pressure fluid to said advancing and retracting means, means including a valve having slow and fast positions for controlling the rate of advance of the spindle and tool element with respect to a workpiece, means responsive to the amount of resistance encountered by the tool element for moving said valve to the slow position when the tool element is in engagement with the workpiece for effecting slow-feed thereof, for moving the valve to the fast position when the resistance is substantially reduced to effect rapid-advance movement of said spindle and tool element, and for shifting said reversing valve to the return position to withdraw the tool element from engagement with the workpiece when the resistance is substantially increased over that encountered under normal feeding conditions, stop means including inter-engaging stops one of which is reciprocable with said spindle for limiting the advancing movement of said spindle, and means operative upon engagement of said stops for shifting said control valve into the return position and for interrupting the supply of pressure fluid to said advancing and retracting means whereby the tool element is withdrawn from the work and the spindle is stopped in a retracted position.

22. In a pressure fluid operated tool, the combination comprising a spindle for mounting a tool element, pressure fluid operated means for advancing and retracting said spindle, a reversing valve having advance and return positions for controlling the admission of pressure fluid to said advancing and retracting means, means including a valve having slow and fast positions for controlling the rate of advance of the spindle and tool element with respect to a workpiece, means responsive to the amount of resistance encountered by the tool element for moving said valve to the slow position when the tool element is in engagement with the workpiece for effecting slow-feed thereof, for moving the valve to the fast position when the resistance is substantially reduced to effect rapid advance movement of said spindle and tool element, stop means including inter-engaging stops one of which is reciprocable with said spindle for limiting the advancing movement of said spindle, and means operative upon engagement of said stops for shifting said control valve into the return position and for interrupting the supply of pressure fluid to said advancing and retracting means whereby the tool element is withdrawn from the work and the spindle is stopped in a retracted position.

23. In a pressure fluid operated tool, the combination comprising a spindle for mounting a tool element, a pressure fluid actuator for advancing and retracting said spindle, a control valve having advance and return positions for controlling the admission of pressure fluid to said actuator, means including a valve having slow and fast positions for controlling the rate of advance of said spindle and tool element with respect to a workpiece, means including an element shiftable in response to the amount of resistance encountered by said tool element for moving said valve into slow position upon engagement with the workpiece when there is substantial resistance to the advance of said spindle and tool element to effect slow-feed thereof, and for moving said valve into the fast position when the resistance is substantially reduced to effect rapid-advance of said spindle and tool element, a first relief valve operatively associated with said control valve, an operator effective when resistance to the advance of said spindle and tool element is substantially increased over that encountered under normal feeding condition for operating said first relief valve to effect shifting of said control valve into the return position thereof so as to withdraw the tool element from engagement with the workpiece, a second relief valve operatively associated with said control valve, and a second operator effective upon withdrawal of said spindle and tool element for operating said second relief valve to effect shifting of said control valve into advance position thereof so as to effect re-engagement of the tool element with the workpiece to continue operation thereon.

24. In a pressure fluid operated tool, the combination comprising a spindle for mounting a tool element, a pressure fluid actuator for advancing and retracting said spindle, a control valve having advance and return positions for controlling the admission of pressure fluid to said actuator, means including a valve having slow and fast positions for controlling the rate of advance of said spindle and tool element with respect to a workpiece, means including an element shiftable in response to the amount of resistance encountered in the advance of said spindle and tool element for moving said valve into slow position when there is substantial resistance to the advance of said spindle and tool element to effect slow-feed thereof, and for moving said valve into the fast position when the resistance is substantially reduced to effect rapid-advance of said spindle and tool element, a first relief valve operatively associated with said control valve, an operator effective when resistance to the advance of said spindle and tool element is substantially increased over that encountered under normal feeding condition for operating said first relief valve to effect shifting of said control valve into the return position thereof so as to withdraw the tool element from engagement with the workpiece, a second relief valve operatively associated with said control valve, a second operator effective upon withdrawal of said spindle and tool element for operating said second relief valve to effect shifting of said control valve into advance position thereof so as to effect re-engagement of the tool element with the workpiece to continue operation thereon, means including inter-engaging stops, one of which is reciprocable with said spindle for limiting advancing movement of said spindle, and a third relief valve operatively connected with said control valve and effective upon engagement of said stops to effect shifting of said control valve into the return position so as to withdraw the tool element from the work.

25. In a pressure fluid operated tool, the combination comprising a spindle for mounting a tool element, a pressure fluid actuator for advancing and retracting said spindle, a control valve having advance and return positions for controlling the admission of pressure fluid to said actuator, means including a valve having slow and fast positions for controlling the rate of advance of said spindle and tool element with respect to a workpiece, means including an element shiftable in response to the amount of resistance encountered in the advance of said spindle and tool element for moving said valve into slow position when there is substantial resistance to the advance of said spindle and tool element to effect slow-feed thereof, and for moving said valve into the fast position when the resistance is substantially reduced to effect rapid-advance of said spindle and tool element, a first relief valve operatively associated with said control valve, an operator effective when resistance to the advance of said spindle and tool element is substantially increased over that encountered under normal feeding condition for operating said first relief valve to effect shifting of said control valve into the return position thereof so as to withdraw the tool element from engagement with the workpiece, a second relief valve operatively associated with said control valve, a second operator effective upon withdrawal of said spindle and tool element for operating said second relief valve to effect shifting of said control valve into advance position thereof so as to effect re-engagement of the tool element with the workpiece to continue operation thereon, means including inter-engaging stops, one of which is reciprocable with said spindle for limiting advancing movement of said spindle, valve means having on and off positions operatively associated with said actuator and said control valve, a third relief valve operatively connected with said control valve and with said valve means and operative upon engagement of said stops to effect shifting of said control valve into the return position and said valve means into the off position so as to retract said spindle and withdraw the tool element from the workpiece and to interrupt the supply of pressure fluid from said control valve to said actuator whereby said spindle is stopped in a retracted position.

(References on following page)

References Cited in the file of this patent

UNITED STATES PATENTS

| | | |
|---|---|---|
| 1,812,533 | Hunt | June 30, 1931 |
| 1,911,132 | Macomber | May 23, 1933 |
| 2,079,640 | Vickers et al. | May 11, 1937 |
| 2,335,809 | Stacy | Nov. 30, 1943 |
| 2,459,902 | Tucker | Jan. 25, 1949 |
| 2,690,205 | Stary | Sept. 28, 1954 |

FOREIGN PATENTS

| | | |
|---|---|---|
| 2,499 | Great Britain | May 26, 1882 |